United States Patent
Schirk

[19]

[11] Patent Number: 6,096,260
[45] Date of Patent: Aug. 1, 2000

[54] COOLING SYSTEM FOR DROSS PRESSING HEAD USING SAND

[75] Inventor: Peter G. Schirk, Exton, Pa.

[73] Assignee: Altek International, Inc., Exton, Pa.

[21] Appl. No.: 09/476,676

[22] Filed: Dec. 30, 1999

Related U.S. Application Data

[60] Provisional application No. 60/119,331, Feb. 9, 1999.

[51] Int. Cl.[7] ........................................... C22B 7/04
[52] U.S. Cl. ........................ 266/205; 266/227; 266/241
[58] Field of Search .................. 266/201, 205, 266/227, 241

[56] References Cited

U.S. PATENT DOCUMENTS

| | | | |
|---|---|---|---|
| 4,033,760 | 7/1977 | Lance et al. | 75/68 |
| 4,039,173 | 8/1977 | Papafingos et al. | 266/201 |
| 4,356,033 | 10/1982 | Davey | 75/63 |
| 4,480,797 | 11/1984 | Weiss | 241/65 |
| 4,523,949 | 6/1985 | Gower et al. | 75/24 |
| 4,527,779 | 7/1985 | Roth et al. | 266/227 |
| 4,540,163 | 9/1985 | van Linden et al. | 266/201 |
| 4,637,591 | 1/1987 | McMahon et al. | 266/165 |
| 4,772,320 | 9/1988 | van Linden et al. | 75/68 R |
| 5,397,104 | 3/1995 | Roth | 226/227 |
| 5,599,379 | 2/1997 | Spoel et al. | 266/227 |
| 5,669,957 | 9/1997 | Roth | 75/585 |
| 5,788,918 | 8/1998 | Bramley | 266/227 |
| 5,811,056 | 9/1998 | Bramley | 266/205 |
| 5,882,580 | 3/1999 | Pownall | 266/205 |
| 5,906,790 | 5/1999 | Bramley | 266/205 |
| 5,980,817 | 11/1999 | Pownall | 266/227 |

*Primary Examiner*—Scott Kastler
*Attorney, Agent, or Firm*—Michael F. Petock, Esq.

[57] ABSTRACT

An improved cooling system for cooling the head of a dross press used in the recovery of non-ferrous metals from dross utilizes a controlled flow of cooling fluid (preferably water) through a cooling coil mounted in particulate matter having a high absorbtivity for heat, preferably sand and most preferably chromite sand. A temperature sensor is mounted within the particulate material or sand, and is used to control the flow of water through the coil in the cooling head. When a temperature above a predetermined value is sensed, water flow through the cooling coil is caused to increase. When the sensed temperature is below a second predetermined value, the controlled water flow through the cooling coil is caused to decrease. Apparatus is also provided for controlling the amount of time that the dross press head is in contact with the dross to be pressed as a function of the temperature of the dross.

6 Claims, 1 Drawing Sheet

COOLING SYSTEM FOR DROSS PRESSING HEAD USING SAND

CROSS REFERENCES TO RELATED APPLICATIONS AND PATENTS

This application claims the benefit of U.S. Provisional Application No. 60/119,331, filed Feb. 9, 1999. The teaching of U.S. Pat. Nos. 5,397,104 - Roth and 5,669,957 - Roth are incorporated by reference herein the same as if set forth at length. These patents are owned by the Assignee herein.

FIELD OF THE INVENTION

The present invention relates to the pressing of dross for the recovery of metal. More particularly, the present invention relates to an apparatus and method for cooling a dross pressing head in such a system.

BACKGROUND OF THE INVENTION

It is the goal of every dross producer not to have thermiting dross. However, the nature of the melting operation and the material does not allow thermiting to always be avoided. In certain applications and melting operations, at least some thermiting dross may be generated regularly. When dross thermites, valuable metal is lost. Although the equipment described in the patents referenced above, which patents are assigned to the Assignee hereof, reduce thermiting in many cases, improvement can be made particularly where violently thermiting dross is produced.

SUMMARY OF THE INVENTION

An advantage of the present invention is that it provides an improved cooling system for a dross pressing head.

Another advantage of the present invention is that it improves cooling of a dross pressing head more effectively than water, air or air with a water mist.

Another advantage of the present invention is that it provides a method of cooling a dross pressing head, without risk of off gassing, boiling or expansion within the dross press head and/or associated equipment.

Another advantage of the present invention is that it provides a system in which there is more effective control of the cooling action.

Another advantage of the present invention is that effective control of the cooling action provided by the present invention prevents dross from being cooled too rapidly wherein small metal droplets are "frozen" too quickly, preventing optimum consolidation of the metal into sheets or larger particle sizes which are easier to recover.

In accordance with the present invention, a cooling system for a dross pressing head is provided wherein a substantially hollow dross press head is provided with a cooling coil within the dross press head. A particulate material, having a high absorptivity for heat as compared to water, is packed around the coil within the hollow head. A control system is provided to control the flow of cooling water through the cooling coil.

In accordance with the present invention, the particulate material is preferably a sand having a high absorptivity for heat as compared to water. In a presently preferred embodiment, the particulate material is chromite sand.

In accordance with the present invention, the flow of water through the coil within the hollow head is controlled by valves controlled in response to a sensor sensing the temperature of the dross press head. When the dross press head temperature rises above a predetermined temperature, water flow through the cooling coil is increased. When the dross press head temperature is sensed by the sensor to be below a predetermined value, cooling water through the coil is decreased or shut off.

In accordance with the present invention, not only is it contemplated that the rate of cooling may be controlled by controlling the amount or rate of water flow through the cooling coil within the head, but also that the amount of time that the press head is in contact with the dross is controlled in response to the sensed temperature, which is a function of the temperature of the dross, which may or may not be thermiting.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
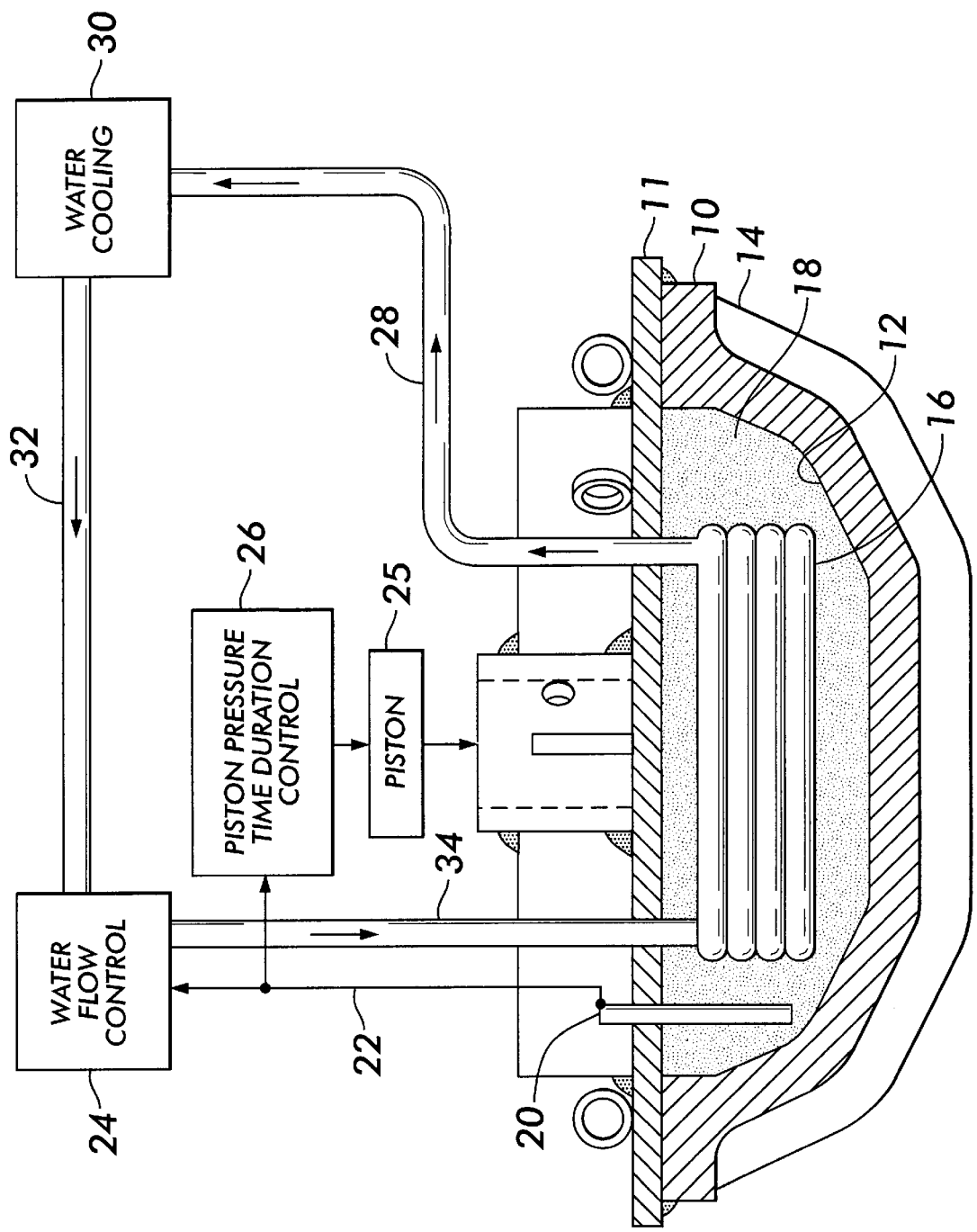
FIG. 1 is a cross sectional view of a dross pressing head using a cooling system in accordance with the present invention which incorporates a block diagram of controls utilized in connection therewith.

Referring now to the drawing, there is shown in FIG. 1 a dross press head 10 which is provided with a hollow interior indicated at 12. The dross press head 10 may or may not be provided with ribs 14. The use of ribs and their advantages are described more particularly in the patents incorporated herein by reference, namely U.S. Pat. Nos. 5,397,104 and 5,669,957. Furthermore, the dross press head 10 may be of any suitable shape, but is preferably somewhat spherical or an elongated shape as described in the aforesaid patents.

In developing the present invention, testing was carried out with respect to the ability of water, air or a mixture of air with water mist to remove heat from a dross press head during operation. It was found that water was the most effective, air with a water mist was the second most effective and the circulation of air alone was least effective. While all of the foregoing removed heat to some degree, they were all found to be ineffective to remove sufficient heat if the dross were violently thermiting. As a result of the testing revealing the poor results of the cooling ability of air, and the less than satisfactory results of water and air with water mist for thermiting dross, it was decided that some other approach totally foreign to this art had to be developed. Although it was noted that water had a greater capability than air or an air and water mist, in the case of violently thermiting dross, water still could not absorb the heat fast enough. With the use of air or an air/water mist, one of the problems was insuring that the air contacts the inside surface of the press head. With the use of water, a baffle could be used to force the water to stay in contact with the press head. When air or any other gas is used, a baffle is no longer sufficient to prevent the short circuiting of the air.

In accordance with the present invention, the hollow dross press head 10 was fitted with a cooling coil 16, primarily for the circulation of water as a cooling fluid, but, it is understood that other cooling fluids may be utilized. A particulate material 18, which has a high absoiptivity for heat, was packed within the hollow portion of the dross press head 10 in and around cooling coil 16. Preferably, this particulate material is a sand which has a high heat absorptivity and in a presently preferred embodiment, this particulate material is chromite sand. In the presently preferred embodiment, chromite sand sold under the trademark "HeviSand" by American Colloid Company of 5100 Suffield Court, Skokie, Ill. 6077 was utilized. However, it is understood that other particulate material having a high heat absorptivity and other chromite sand may be utilized in practicing the present invention.

A typical chemical analysis of the particular chromite sand utilized, that is the sand sold under the "HeviSand" trademark, was approximately 47% chromite oxide, approximately 19.6% iron oxide, approximately 1.25% silica, approximately 14.95% alumina, approximately 10.6% magnesia and approximately 0.27% calcium oxide with traces of some other elements. This chemical analysis is provided by way of example and illustration, and not by way of limitation. It is expressly understood that other chromite sand and other particulate material may be utilized in practicing the present invention, so long as it provides a high heat absorptivity. In order to have a high heat absorptivity, and included within the meaning of having a high heat absorptivity, is the understanding that the particulate material would be a relatively good conductor of heat and have a mass adapted to absorb and hold the heat. Another advantage of the particulate material is that it would not produce gases, particularly gas similar to steam which results from the use of water, which steam results in a great expansion of volume over that of the original water which may be under substantial pressure.

Mounted within the hollow portion of dross press head 10 is a temperature sensor or temperature probe 20. The output of temperature sensor 20 is fed via line 22 to water flow control unit 24 and piston pressure time duration control unit 26. Temperature sensor 20 detects the temperature of the dross press head through the chromite sand. This temperature is also a function of the dross being pressed, particularly when the dross press head is in contact with the dross press for a period of time.

The top of dross press head 10 is provided with a metal plate 11 which seals the top of the dross press head and also functions as the mounting support for connection to the piston (indicated in block diagram 25) of a hydraulic cylinder.

As discussed above, water, or some other coolant fluid may be circulated through cooling coil 16, out through water outlet pipe 28 and into water cooling unit 30. Water or other coolant is cooled in water cooling unit 30 and then flows via pipe 32 to water flow control unit 24. Water flow control unit 24 controls the rate of flow of water through cooling coil 16. Water flow control unit 24 contains valves which are controlled by a program in response to the temperature sensed by temperature sensor 20. Water is returned from water flow control unit 24 to cooling coil 16 via water inlet pipe 34. The arrows in pipes 28, 32, 34 indicate the direction of flow of water or other coolant. Water flow control 24 may control the rate of cooling water flow through 16 and may turn on or shut off the flow of water in response to the temperature sensed by temperature sensor or probe 20. When temperature control 20 senses a high temperature, a first predetermined temperature, water flow control unit 24 causes water flow to begin or to increase as may be desired. When temperature sensor 20 detects a second lower predetermined temperature, water flow control 24, in response to this sensed temperature, stops or reduces water flow through cooling coil 16.

The temperature sensed by temperature sensor 20 is also fed to piston pressure time duration control unit 26 which controls the amount of time that dross press head 10 is in contact with the dross. In other words, when the dross temperature is sensed by temperature sensor 20 as being high, the piston pressure time duration control unit 26, lengthens the time that the hydraulic cylinder applies the pressure to the dross head. The hydraulic cylinder is not described here in detail and the teachings and description of hydraulic cylinders and their operation in dross presses are incorporated herein from the aforesaid incorporated teachings of U.S. Pat. Nos. 5,397,104 and 5,669,957. As discussed above, the temperature sensed by temperature sensor or probe 20 is a function of the temperature of the dross, once head 10 is in contact with molten dross for a short period of time. Accordingly, if the dross temperature is not high, the time duration during which the dross press head 10 is in contact with the dross will be shortened by piston pressure time duration control unit 26.

The present invention may be utilized in cooling and controlling dross pressing heads used in connection with the recovery of various types of metal from various types of dross including, but not limited to, aluminum, zinc, lead, magnesium, copper and silver. However, at present, the largest volume of dross being processed is that of aluminum dross and the preferred embodiment of the present invention is particularly adapted for the processing of aluminum dross, but not limited thereto.

The present invention may be embodied in other specific forms without departing from the spirit or essential attributes thereof and, accordingly, reference should be made to the appended claims, rather than to the foregoing specification as indicating the scope of the invention.

I claim:

1. A cooling system for a dross pressing head, comprising:

a substantially hollow dross press head;

a cooling coil within said dross press head;

a particulate material, having a high absorptivity for heat as compared to water, being packed around said coil within said hollow head; and, means adapted to cause controlled water flow through said cooling coil.

2. A cooling system for a dross pressing head in accordance with claim 1 wherein said particulate material is a sand having a high absorptivity for heat as compared to water.

3. A cooling system for a dross pressing head in accordance with claim 1 wherein said particulate material is chromite sand.

4. A cooling system for a dross pressing head in accordance with claim 1 wherein said means adapted to cause controlled water flow through said cooling head causes an increase in water flow through said cooling coil in response to a sensor sensing the temperature of said dross press head being above a predetermined temperature.

5. A cooling system for a dross pressing head in accordance with claim 4 wherein said means adapted to cause controlled water flow through said cooling head decreases the rate of water flow when said sensor senses that the temperature of said press head is below a second predetermined value.

6. A cooling system for a dross pressing head in accordance with claim 1 including means for controlling the amount of time that said dross press head is in contact with dross to be pressed as a function of the temperature of the dross.

* * * * *